US009924245B2

(12) United States Patent
Zhuge et al.

(10) Patent No.: US 9,924,245 B2
(45) Date of Patent: Mar. 20, 2018

(54) SYNCHRONIZED MEASUREMENT DEVICE USING LOCAL AREA NETWORK WITH ETHERNET MESSAGING

(71) Applicant: Crystal Instruments Corporation, Santa Clara, CA (US)

(72) Inventors: James Q. Zhuge, Palo Alto, CA (US); Zhengge Tang, San Jose, CA (US)

(73) Assignee: CRYSTAL INSTRUMENTS CORPORATION, Santa Clara, CA (US)

( * ) Notice: Subject to any disclaimer, the term of this patent is extended or adjusted under 35 U.S.C. 154(b) by 370 days.

(21) Appl. No.: 14/705,417

(22) Filed: May 6, 2015

(65) Prior Publication Data
US 2016/0330793 A1   Nov. 10, 2016

(51) Int. Cl.
*H04L 29/08* (2006.01)
*H04L 29/06* (2006.01)
*H04W 84/18* (2009.01)
*H04W 56/00* (2009.01)
*H04Q 9/04* (2006.01)
(Continued)

(52) U.S. Cl.
CPC ............... *H04Q 9/04* (2013.01); *G06F 1/12* (2013.01); *H04L 67/12* (2013.01); *G01D 21/00* (2013.01); *G01P 15/00* (2013.01); *G01V 1/22* (2013.01); *H04L 67/125* (2013.01); *H04Q 2209/10* (2013.01); *H04Q 2209/30* (2013.01); *H04Q 2209/845* (2013.01)

(58) Field of Classification Search
CPC .. H04Q 9/04; H04Q 2209/10; H04Q 2209/30; H04Q 2209/845; G06F 1/12; H04L 67/12; G01D 21/00; G01P 15/00; G01V 1/22

USPC .................................. 702/188, 187, 104
See application file for complete search history.

(56) References Cited

U.S. PATENT DOCUMENTS 6,469,639 B2   10/2002   Tanenhaus et al.
6,915,466 B2 *  7/2005   Mastro .................. H04L 43/026
                                                                   714/712
(Continued)

FOREIGN PATENT DOCUMENTS

EP   2288215 A1   2/2011

OTHER PUBLICATIONS

"Power over Ethernet", from Wikipedia, http://en.wikipedia.org/wiki/Power_over_Ethernet.

*Primary Examiner* — Ly D Pham
(74) *Attorney, Agent, or Firm* — Thomas Schneck

(57) ABSTRACT

A plurality of measurement devices have analog sensors that measure the dynamic signals of physical events, sample the data into digital format with time synchronized clocks and generate time stamped Ethernet messages that are sent to a remote host. The remote host has a master clock that evaluates decoded time stamped messages from the measurement devices and sends back a message with a time correction error signal relative to the master clock. This feedback signal is used by the measurement devices to correct a local clock for data sampling and new message generation. Eight wire cable and associated connectors are used to handle three channels of traffic, with four wires dedicated to Ethernet messages as one channel, another two wires dedicated to reset and other commands as a second channel and another two wires to transmit power from the host to the measurement devices as a third channel.

8 Claims, 3 Drawing Sheets

(51) Int. Cl.
  *G06F 1/12*  (2006.01)
  *G01P 15/00*  (2006.01)
  *G01V 1/22*  (2006.01)
  *G01D 21/00*  (2006.01)

(56) References Cited

U.S. PATENT DOCUMENTS

| | | | | |
|---|---|---|---|---|
| 7,123,649 B1* | 10/2006 | Smith | ............... | H04M 11/066 375/222 |
| 7,200,158 B2 | 4/2007 | Gustin | | |
| 7,218,623 B1* | 5/2007 | Proctor, Jr. | ......... | H04B 7/2618 370/335 |
| 7,653,895 B1* | 1/2010 | James-Roxby | ......... | H04L 69/12 717/106 |
| 7,823,162 B1* | 10/2010 | Keller | ............... | G06F 17/5054 716/116 |
| 2004/0023087 A1* | 2/2004 | Redmond | ............. | B82Y 30/00 429/515 |
| 2006/0251084 A1* | 11/2006 | Elliot | ................... | H04J 3/0664 370/398 |
| 2007/0019445 A1* | 1/2007 | Blaha | ............... | H02M 3/33523 363/21.12 |
| 2009/0228722 A1* | 9/2009 | Lin | ........................ | H04L 12/10 713/300 |
| 2010/0054138 A1* | 3/2010 | Gips | ..................... | H04L 41/12 370/248 |
| 2010/0318299 A1* | 12/2010 | Golparian | ............... | G01V 1/22 702/14 |
| 2012/0166582 A1* | 6/2012 | Binder | .................. | H04L 63/18 709/217 |
| 2013/0088385 A1* | 4/2013 | Charlot | ................... | G01S 19/02 342/357.44 |
| 2013/0201316 A1* | 8/2013 | Binder | .................. | H04L 67/12 348/77 |
| 2013/0246543 A1 | 9/2013 | Pasek | | |
| 2013/0311799 A1* | 11/2013 | Fitzpatrick | ........... | G06F 1/3296 713/320 |
| 2014/0088873 A1 | 3/2014 | Miller | | |
| 2014/0112400 A1* | 4/2014 | Reuven | .................. | H04B 3/56 375/258 |
| 2014/0328357 A1* | 11/2014 | Fredriksson | ......... | H04J 3/0614 370/520 |
| 2015/0127284 A1* | 5/2015 | Seshan | .................. | G01D 3/022 702/89 |
| 2016/0112182 A1* | 4/2016 | Karnes | ................. | H04J 3/0697 375/362 |
| 2016/0170441 A1* | 6/2016 | McGaughey | ............. | G06F 1/12 713/401 |
| 2016/0191752 A1* | 6/2016 | Takitsune | .............. | H04N 5/067 348/518 |
| 2017/0184799 A1* | 6/2017 | Huegerich | ............ | G02B 6/426 |
| 2017/0244925 A1* | 8/2017 | Zhong | .................... | H04N 5/64 |

\* cited by examiner

SYNCHRONIZED MEASUREMENT DEVICE USING LOCAL AREA NETWORK WITH ETHERNET MESSAGING

TECHNICAL FIELD

The invention relates to data transmission and collection from distributed analog sensors for dynamic signal measurement in a network.

BACKGROUND OF THE INVENTION

There are many applications where an array of measurement sensors is deployed to collect dynamic physical event data, such as seismic shock, vibration, temperature, strain or humidity in industrial manufacturing and testing processes, remote machinery condition monitoring, building structure monitoring, etc. A problem that arises in data collection from such events is that the data, typically dynamic analog data at various frequencies, is collected using expensive instrumentation devices. These instruments are connected to each other via various networks with phase delays, even though taken simultaneously due to differences in network path lengths or slight local clock differences or circuit latency. The kind of measurement system that cannot measure the dynamic data with synchronized clock will make the data acquisition meaningless. For example, if two channels of data are all acquired at 12:00 pm while one of them is marked as 12:01 pm, the time delay or error of the time clock will cause these two signals to be out of phase so that they cannot be compared and used together. Therefore for dynamic data measurement using multiple sensors, acquiring the data at the "same time", meaning, with time synchronization technology, is critical.

U.S. Pat. No. 6,469,639 discloses a method of collecting data from a plurality of sensors, including shock and vibration sensors. The method includes converting the plurality of sensor analog signals into digital data, processing the digital data, generating a data communications protocol for communicating the digital data, and simultaneously and remotely detecting the generated communications data. A data communications processor controls power management of the data acquisition processing circuit.

U.S. Pat. No. 7,200,158 discloses a method of synchronizing data across a network with a device that recognizes the time synchronization packet and substitutes a real-time value from the master internal counter into the proper place in a data packet that is placed between an Ethernet Media Access Controller (MAC) and a Physical Interface Transceiver (PHY). A second device monitors the packet passing from the MAC to the PHY and determines when it is a time synchronization packet from the time master. Upon recognition of the proper packet, the second device simultaneously captures the master's time value and captures the value of a local real-time clock. The result of these captures are presented to the local host computer which controls the time base clock that increments the local real-time clock to either speed up or slow down this local clock, thereby synchronizing the local clock to the time master clock. The offset and skew of the local clock to the master clock is reduced to only the network latency plus variability due to network congestion.

European patent application 2288215 discloses a method for exchanging data between a plurality of sensors and/or actuators and an appropriate destination in a core network.

U.S. Published Application 2013/0246543 discloses networked sensor devices configured to obtain sensor readings from one or more sensors and then store the sensor readings in a server by way of a wireless or wired network using Ethernet protocol for communication of sensor information.

U.S. Published Application 20140088873 discloses use of Ethernet protocol for devices that integrate sensors for dissemination of lightning data over wired or wireless networks. The apparatus features a communication jack that houses a communication port, a sensor and a sensor data server. The server is coupled with both the port and the sensor and is configured to obtain sensor data from the sensor and provide access to the sensor data via the communication port. The system is a plurality of such communication jacks distributed over a geographic range.

Power over Ethernet (PoE), described at http://en.wikipedia.org/wiki/Power_over_Ethernet, is a power supply technology for Ethernet wiring where, in one mode called "Mode B", spare lines of Cat 5 or Cat 6 cable are energized by line drivers capable of sourcing a few milliamperes of current that is sufficient to obtain all required electrical power for a remote device through the lines. In another mode called "Mode A", power can be carried on the data lines. In either situation, a host can provide power to remote devices such as switches, IP phones and the like.

An object of the invention was to reduce packaging size for remote sensors of a sensor array, while increasing the flexibility of supporting large voltage drops in long cables, and reducing the cost.

Another object of the invention was to devise an array of high speed remote sensors that measure analog physical signals and can gather data from a single event or vibration source at a central server for recording or display, with synchronization to account for phase delays and the like among individual remote sensors.

SUMMARY OF INVENTION

The above object has been met with a network of measurement devices, arranged over an area, i.e. a local area network, and exhibiting phase delays, as well as circuit or transmission latency when sampling analog data from the same event, such as seismic data, vibration and shock, and other dynamic data that may be sampled in milliseconds or faster. The network features a host having a central processing unit (CPU), storage memory, a master clock, and an Ethernet network switch that sends and receives messages. The host has multiple connectors communicating with the CPU, a power supply with power management logic communicating power to power lines associated with each connector, an Ethernet transceiver associated with each connector for sending and receiving time synchronization messages from the network switch on message lines associated with each connector, and control lines associated with each connector to send commands from the CPU. Each connector is reserved for communication with one of the measurement devices. Ethernet communication of measurement data between a measurement device and the host is via a four-wire channel associated with a connector. Each connector employs an additional two channels, including a two-wire channel as a power channel and a two-wire order wire channel for commands, for a total of three dedicated channels per connector.

The amount of power transmitted from the host power supply to each measurement device on the power channel must be sufficient to power the analog sensor, an A/D converter, logic circuits and a data transceiver. Although low power CMOS digital circuits are used where possible, adequate power for all components must be provided. Power demand is established by each measurement device and met by the host. Commands on the order wire channel can be on-off and reset commands, as well as other commands. While an Ethernet channel can be used to send and receive data, program code or even commands, there are cases when an Ethernet channel is not usable such as when TCP/IP protocol has not been established. Thus a separate order command channel is needed and can establish high reliability of controlling the remote measurement devices from the host.

Each measurement device has an analog sensor measuring dynamic data, such as shock or vibration, connected to an analog-to-digital converter producing digital data from the dynamic analog data. The process of converting analog data into digital is called sampling. How fast and when the sampling happens is governed by a sampling clock. The sampling clock of each analog-to-digital converter is derived from a local clock, i.e., the slave clock on each measurement device. It is the objective of this invention that all the sampling clocks on all measurement devices connected by the host are eventually synchronized. A typical sensor is a 3-axis accelerometer that transmits 3-path analog outputs to a 3-path analog to digital converter and then to time stamped message formation. The measurement device has a logic circuit with an embedded core that applies a time stamp from the slave clock to the digital data for transmission to the host as time stamped local data messages in Ethernet protocol. Transmission is via a data transceiver that transmits the time stamped messages to the host using the four-wire Ethernet channel and associated connector. The host then provides feedback to each measurement device using the same Ethernet channel carrying time synchronization correction messages for the slave clock relative to the master clock so that all sampling clocks are synchronized, and the time synchronization of measurement data at the host from the plurality of measurement devices is achieved by exchange of time stamped data messages and time synchronization correction messages.

DETAILED DESCRIPTION

Figure 1:
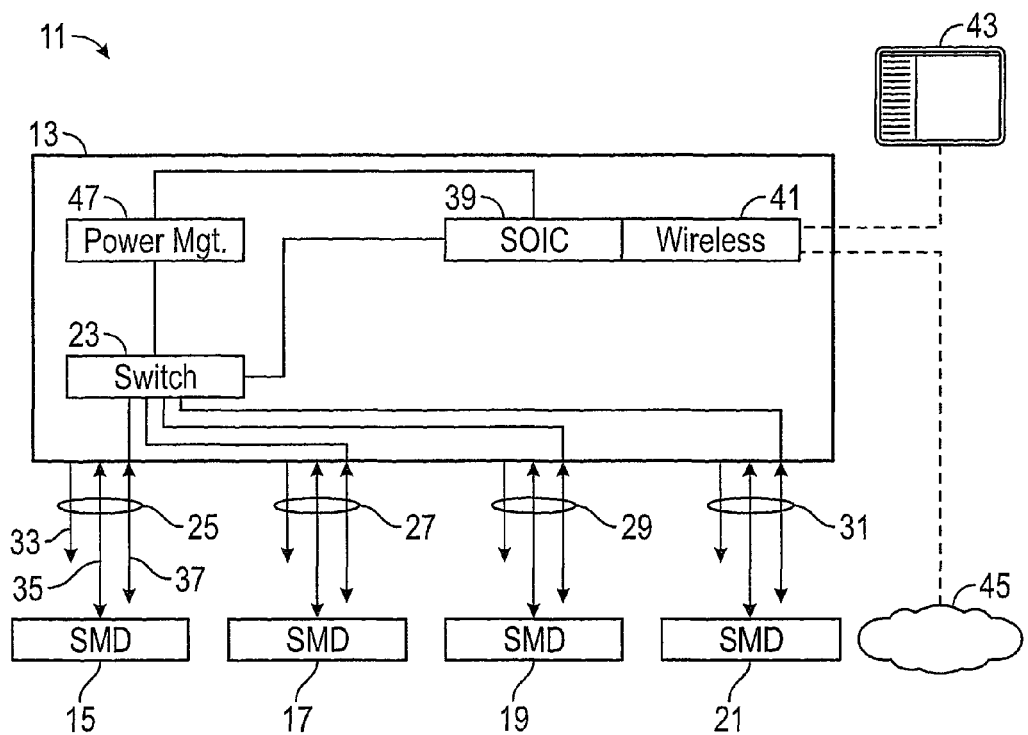
FIG. 1 is a block diagram of synchronized measurement devices using a local area network with Ethernet messaging in accordance with the invention.

With reference to FIG. 1 an area network 11 features a host device 13 communicating with sensor measurement devices 15, 17, 19 and 21. The host device 13 has a network switch 23 with 8-wire connectors 25, 27, 29 and 31 that may be standard RJ45 connectors. Each sensor measurement device, such as device 15, communicates through an associated connector, such as connector 25 using 3 dedicated channels, including a power channel 33, an Ethernet message channel 35 and an order wire channel 37 for commands. The three channels are accommodated on 8 wires for an 8-wire connector, for example of the RJ45 type. A typical allocation of wires is further discussed below with reference to FIG. 3.

The network switch 23 is a typical Ethernet message switch chip set that distributes Ethernet messages among the connectors 25, 27, 29 and 31. The network switch is connected to a fanless computer board 39 that acts as a server. The board may be a PC104 system on a chip (SOIC) type of board with an Intel Atom processor or CPU, electronic memory, a hard drive for data storage, a graphics processor, and input-output circuitry. A slot for a wireless card 41 is needed to allow a remote display device 43 to be wirelessly connected to the host or to cloud storage 45. A power manager module 47 is connected both to the switch 23 and to the computer board 39. The power manager module receives DC power from a computer power supply, not shown, that produces several levels of rectified DC power from AC. The power manager module provides power to the host in the usual way and also provides calibrated amounts of power to each of the sensor measurement devices 15, 17, 19, 21 to meet the power demands of each device, with power being communicated over a power channel 33 associated with a connector 25. Power is fed to each power channel through the switch 23 on a continuous basis since measurement devices must feed power to sensors that can respond at any time to measurement phenomena.

Figure 2:
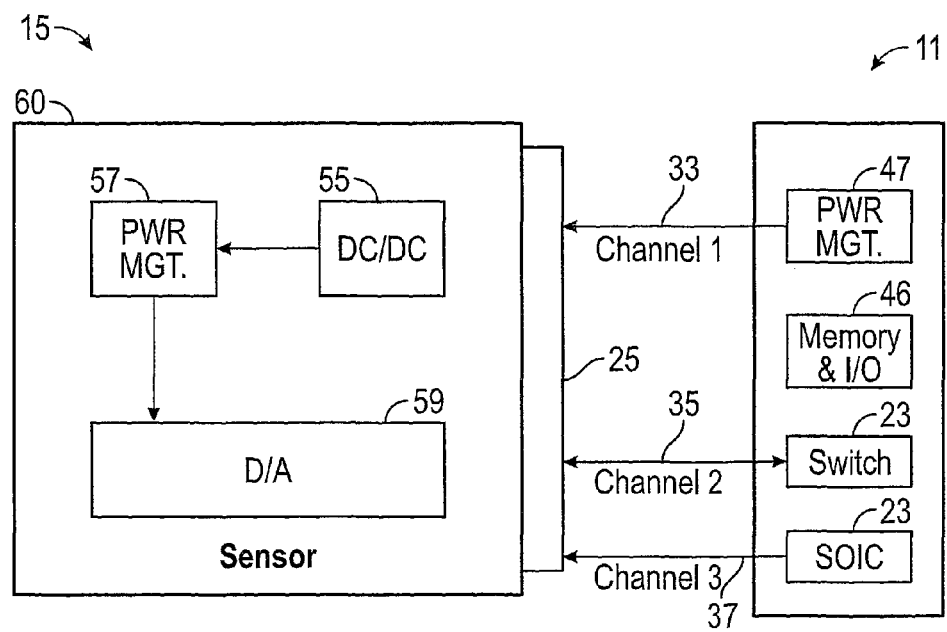
FIG. 2 is a simplified diagram of a measurement device used in the network of FIG. 1 with 3 connector channels connecting to a host device.

With reference to FIG. 2, the host 11 has power manager module 47 transmitting electrical power over two wires that make up channel one, 33, in a cable connected by a connector 25 to the measurement device 15. Switch 23 of the host transmits Ethernet messages over four wires of channel two, 35, of the same cable, while the CPU or SOIC 39 transmits commands over two wires of channel three, 37, to the measurement device, also using the same cable. All channels, with a total of 8 wires, pass through connector 25 into the measurement device 15.

Within the measurement device 15, a power converter 55 receives power remotely from host 11. Power can be transmitted up to 300 meters on a CAT 5 cable with significant voltage drop. The voltage drop will be well handled by the power regulation circuitry in each measurement device. The input voltage to the power converter is typically in the range of 5.5 volts to 15 volts. The power converter steps this voltage down to a regulated 5 volt output that is fed to a power management circuit 57. Voltage from the power management circuit 57 is supplied to analog to digital circuits 59 that are connected to at least one sensor 60, also receiving the same voltage from the power management circuit. Sensor data is taken in the analog to digital circuits 59 and packaged as Ethernet messages sent with a transceiver on channel two, 35, to switch 23 of the host 11. The SOIC 39, using memory and I/O circuits 46 can issue stop, start or reset commands via channel three, 37, essentially an order wire for sending commands from the host 11 to the measurement device 15.

Figure 3:
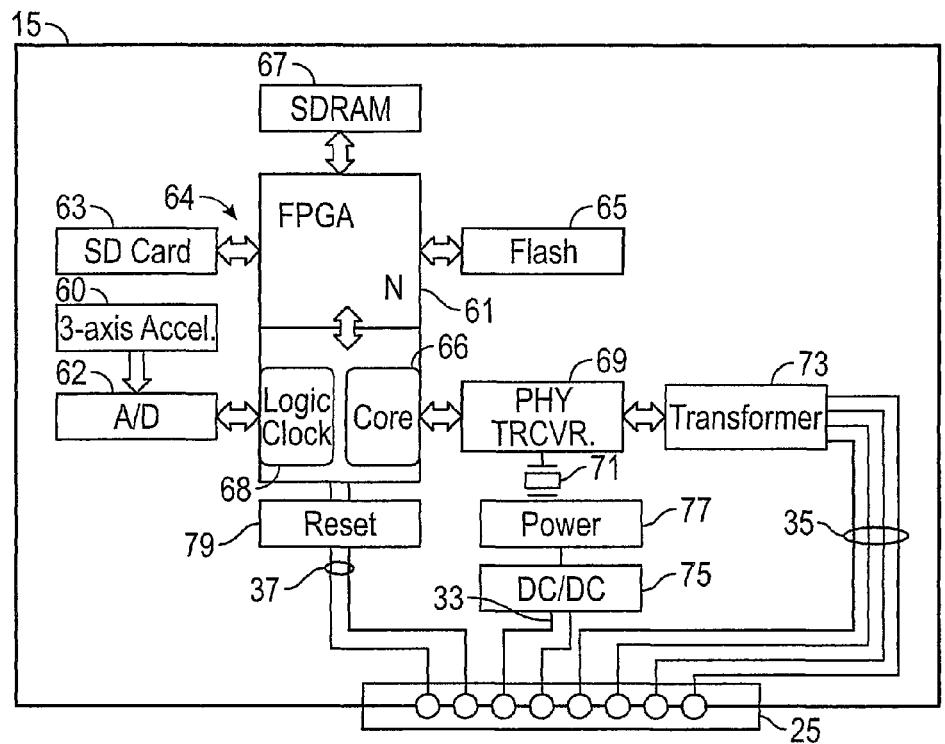
FIG. 3 is a block diagram of a measurement device as shown in FIG. 2.

In FIG. 3, measurement device 15 is seen to have a sensor 60, such as a 3-axis accelerometer on a chip, for example an ADXL326 chip that includes X,Y,Z axis accelerometers, amplifiers, demodulators and 3 output amplifiers. The use of accelerometers is indicated for shock and vibration measurements. Other sensors could be used for weather, seismic or volcanic, geophysical or manufacturing and testing data. Any kind of sensors that gather high speed analog signals could be used here. Analog sensor data from the accelerometers is transmitted to analog-to-digital converters that can be implemented with two AK5357 chips, with each chip handling 2 analog signals with only 3 of the 4 signal paths being needed. Digital output data from the converter needs to be packaged as Ethernet messages to be transmitted on 2 wires. This is done by an FPGA 64 that has an embedded microprocessor core 66 that forms the messages as will be explained below. Message formation is clocked by logic clock 68 running at a speed compatible with Ethernet transmission rates, such as 10baseT, 100baseT or 1000baseT running at speeds of 10 Mbits/sec., 100 Mbits/sec or 1000 Mbits/sec respectively. Logic gates 61 contain programming instructions for message formation and transmission with a bus connecting the gates 61 to core 66. An optional memory card 63 can be used to store programming data that cannot be stored in the logic gates 61. An optional serial peripheral interface flash memory 65 may be used to store programming data for the logic gates 61 that needs to be loaded serially into the logic gates. An amount of random access memory 67 is connected to logic gates 61 for storing intermediate results from message forming operations and reloading the intermediate results back into the logic gates 61.

Digital data that has been packaged into 8-bit messages is transmitted on 2 lines to a PHY transceiver chip 69 which may be a LAN8710A transceiver by Microchip. A local 25 MHz oscillator 71, connected to the PHY transceiver chip, or part of the chip, establishes the base frequency for data transmission after appropriate frequency division, depending on data transmission rate. This is the local frequency that will be corrected by feedback from the host. Message data input and output of the transceiver is sent through a transformer 73 for signal transmission purposes at appropriate low voltage signal levels.

Four wires, two transmit lines and two receive lines form an Ethernet message channel 35 connected to connector 25. Two lines handle message traffic in one direction, while two wires handle simultaneous message traffic in the opposite direction. Typically, a first direction is for outgoing traffic, while a second direction is for incoming traffic. Two other lines form a power channel 33 feeding the DC input-DC output voltage step up chip 75 that is connected to a power distribution unit 77 that provides power to circuits of the measurement device as needed. Power is supplied by the distant host as required by measurement devices on the power channel associated with connector 25. Two reset lines form a command channel or order wire channel 37. Signals in this channel can trigger the reset switch 79 which restarts message formation by resetting the core 66 and the logic clock 68.

The connector 25 is extended by a CAT 5 or 6 cable for up to 300 meters to a host without phase shift among bits in all of the channels. On the other hand, delay caused by the cable, or software latency, can cause data from several measurement devices that are measuring the same event to be skewed or out of synchronization. Since the data is transmitted in messages, the host computer provides time delay corrections from a master clock in return messages received in the Ethernet channel and sent to the core 66 via the transceiver 69. The core adjusts the logic clock 68 so that new messages are synchronized.

Figure 4:
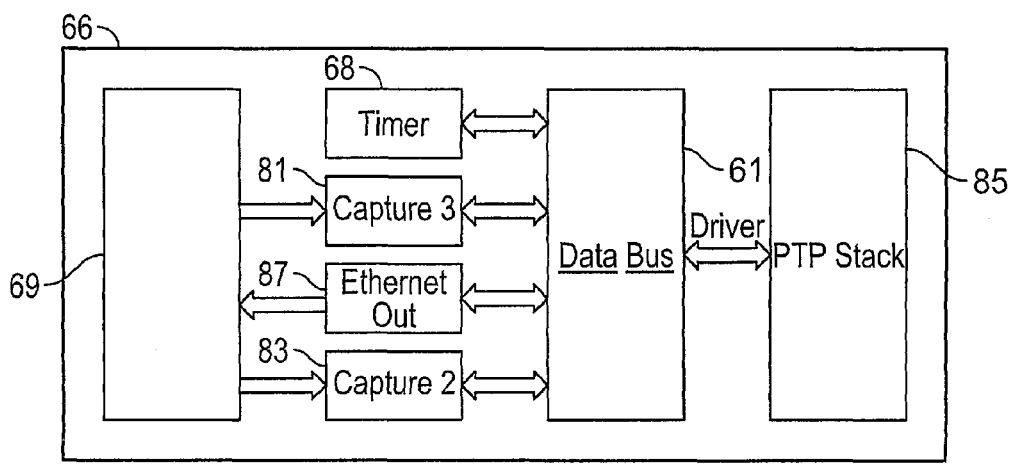
FIG. 4 is an operational block diagram of core operation in a measurement device of FIG. 3 showing clock synchronization with Ethernet messages.

In FIG. 4 message synchronization is achieved in the core 66 that has incoming message capture buffers 81 and 83 where incoming time correction Ethernet messages from a remote host are received after passage through the PHY transceiver chip 69. These messages are routed along parallel lines of a data bus to be decoded in the logic gates 61 using a time base clock appropriate for the message speed. The messages are converted to instructions sent to an instruction stack 85 for industry standard precision time protocol (PTP) a time correction algorithm executed by the core 66 for clock synchronization. Simultaneously, outgoing messages encoded in the logic gates 61 are packaged and routed via a transmit buffer 87 for transmission using the transceiver 69.

Figure 5:
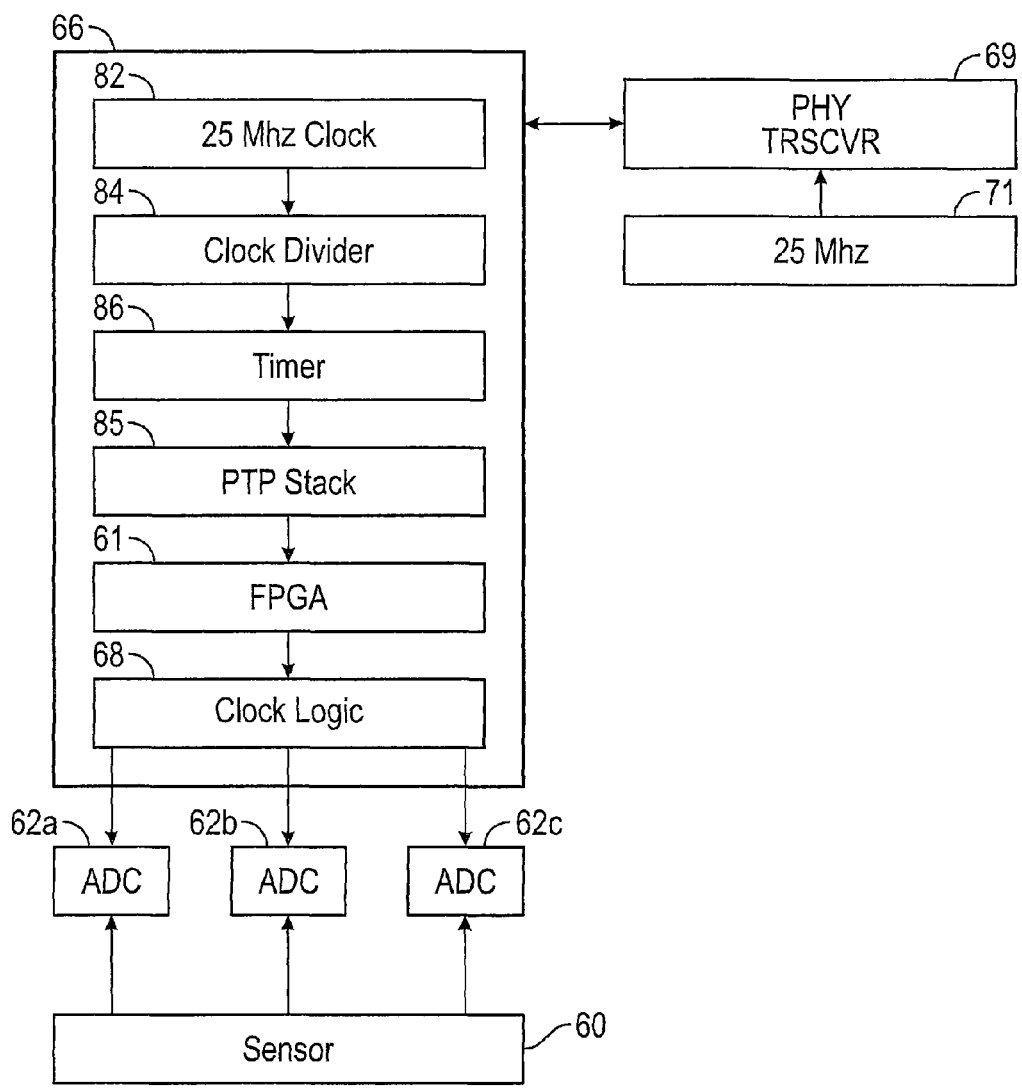
FIG. 5 is an another block diagram of core operation in a measurement device of FIG. 3 showing time stamping of data messages for transmission as Ethernet messages.

FIG. 5 shows another view of core 66 wherein a 3-axis sensor 60 generates 3 data components (X,Y,Z) via analog-to-digital converters 62a, 62b and 62c. As shown in FIG. 1, clock logic 68 is a sampling clock associated with the A/D converters. A timing signal for the sampling clock is derived from the local oscillator 71 that is associated with the PHY chip transceiver 69. The oscillator timing, nominally 25 MHz, is transmitted into the PHY transceiver 69 from the local oscillator 71. The timing signal is transmitted into core 66 via a buffer 82 that transmits the signal into a clock divider 84 to provide a clock signal that will set the message transmission rate selected by timer 86. The rate signal, is applied to the PTP instruction stack 85 that works with the FPGA 61 to package messages from the data in the A/D converters 62a, 62b and 62c, with a time stamp corrected by incoming messages decoded in the FPGA. Time stamped messages are routed via PHY transceiver chip 69 to the remote host for data logging. All remote measurement devices should be sampling time corrected data.

In operation, measurement devices have analog sensors that measure an event and generate time stamped digital data by the analog-to-digital converter, and then send the digital data using an Ethernet transceiver to a remote host. The remote host has a master clock that evaluates decoded time stamped messages from the measurement devices and sends back a message with an error signal relative to the master clock. This feedback signal is used by the measurement devices to correct a local clock for new message generation with time synchronized measurement data.

The packaging of measurement devices can take various physical forms. They can be constructed by independent electronic components on a small printed circuit board, or compact many digital circuitry into an FPGA (Field Programmable Gated Array), or fully integrated into an ASIC (Application Specific Integrated Circuit) which has a size of less than a coin.

What is claimed is:

1. A network of devices for acquiring sensor data from an array of measurement devices comprising:
 a host having a central processing unit (CPU) with associated storage memory, a master clock, an Ethernet network switch associated with the master clock, the host having multiple connectors communicating with the CPU, a power supply with power management logic communicating power to power lines associated with each connector, an Ethernet transceiver associated with each connector for sending and receiving time synchronization messages from the network switch on message lines associated with each connector, and control lines associated with each connector to send commands from the CPU, power lines associated with the connectors being distinct from the message and control lines, wherein the host is connected to the measurement devices by a cable having wires in three channels, wherein the three channels include a first channel for time synchronized data messages, a second channel for power and a third channel for commands;
 a plurality of measurement devices, each measurement device connected to one of the host connectors for receiving commands and power from the host and having a transceiver for sending and receiving time synchronized and sensor data messages, each measurement device having a slave clock, an analog measurement sensor measuring dynamic signals of an event at an associated analog-to-digital converter producing digital data from the analog dynamic signals, the measurement device having a logic circuit with an embedded core, the logic circuit programmed with time stamp logic that applies the slave clock to the digital data for transmission to the host as outgoing time stamped synchronized sensor data messages;

whereby the host has means for providing feedback to each measurement device with time synchronization correction messages to the slave clock of each measurement device relative to the master clock so that all slave clocks on measurement devices are synchronized with time synchronization of measurements at the host from the plurality of measurement devices, achieved by exchange of messages with time synchronization correction feedback in messages from the host.

2. The apparatus of claim 1 wherein said messages are Ethernet protocol messages.

3. The apparatus of claim 1 wherein the analog measurement sensor is a 3-axis accelerometer.

4. The apparatus of claim 1 wherein said connectors are 8-wire connectors.

5. The apparatus of claim 1 wherein the logic circuit is an FPGA.

6. The apparatus of claim 5 wherein the FPGA has an embedded core.

7. The apparatus of claim 5 wherein the FPGA contains instructions for message formation.

8. The apparatus of claim 1 wherein the analog to digital converter simultaneously handles at least three analog signals in separate signal paths.

* * * * *